INVENTORS
HENRI A. DELCELLIER
PHILLIP J. MILLS

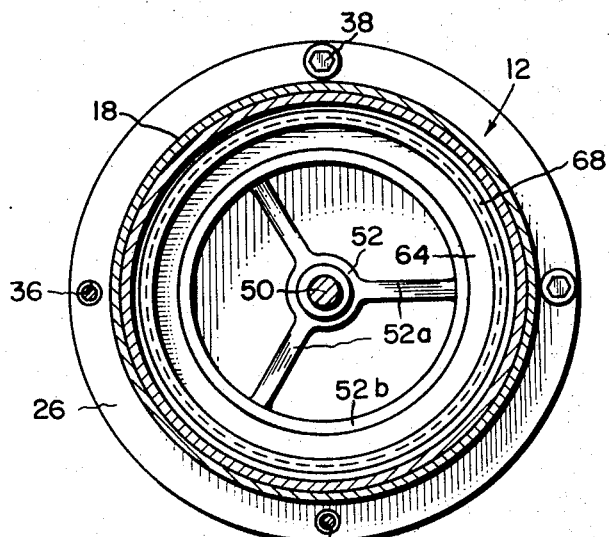
FIG. 4
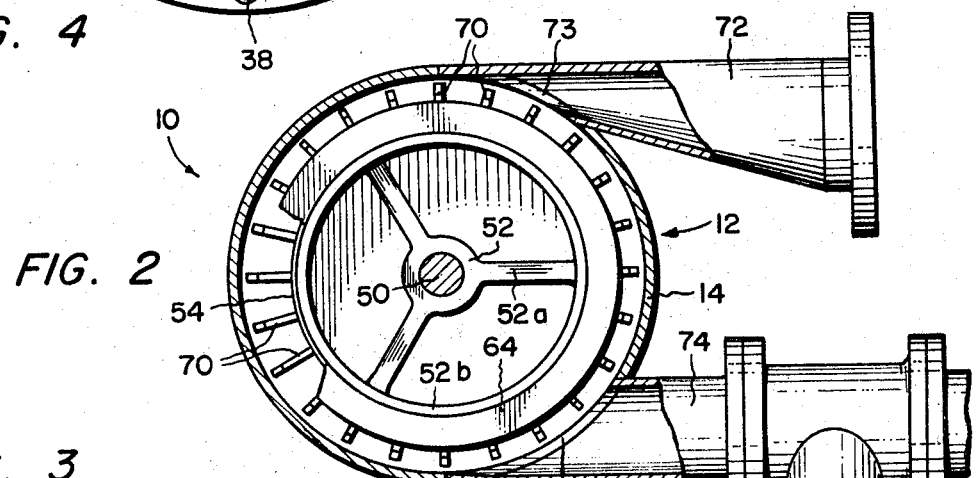
FIG. 2
FIG. 3
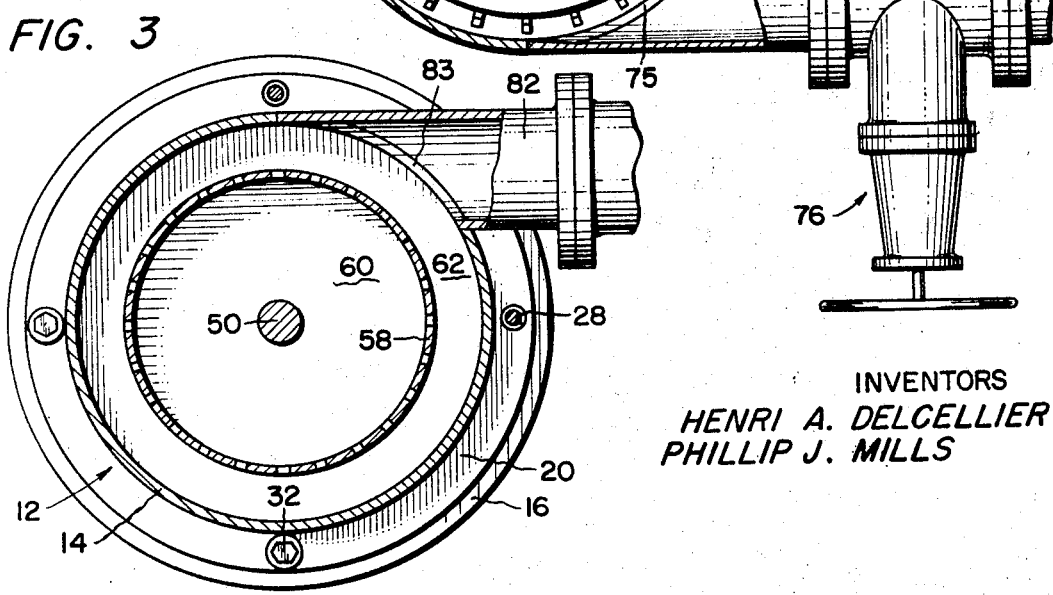
INVENTORS
HENRI A. DELCELLIER
PHILLIP J. MILLS

United States Patent Office 3,448,858
Patented June 10, 1969

---

3,448,858
CENTRIFUGAL FILTERING APPARATUS
Henri A. Delcellier, Beaureparie, Quebec, and Phillip J. Mills, Sherbrooke, Quebec, Canada, assignors to Canadian Ingersoll-Rand Co., Ltd., Montreal, Quebec, Canada, a corporation of Canada
Continuation of application Ser. No. 547,635, May 4, 1966. This application July 25, 1968, Ser. No. 751,679
Int. Cl. B01d *33/06;* B07b *1/24*
U.S. Cl. 209—270                                    13 Claims

ABSTRACT OF THE DISCLOSURE

A centrifugal filtering apparatus comprising a housing containing a cavity, and a screen which carries a plurality of paddles and is positioned within the housing cavity. The housing and screen are relatively movable such that the screen may be located either concentrically or eccentrically within the cavity; and a mounting means is provided for rotatably mounting the screen in either of these alternative positions. The fluid inlet and a third or auxiliary outlet, selectively closable by a valve, communicate with the cavity at the level of the paddles and are arranged at least 180 degrees apart such that fluid introduced into the cavity through the inlet may, after acting on the paddles, be immediately discharged through the third outlet.

---

This application is a continuation of Ser. No. 547,635, filed May 4, 1966, and now abandoned, which in turn is a continuation-in-part of Ser. No. 353,775, filed Mar. 23, 1964, and now abandoned.

This invention relates to pulp and paper making machinery and has more specific reference to the provision of a new and improved centrifugal filtering apparatus which is particularly constructed and arranged for separating and/or concentrating the deleterious solids contained in the effluent fluid discharged by pulp and paper making machinery from the diluent or liquid component of the effluent fluid.

The operation of pulp and paper mills is heavily dependent upon the employment of vast quantities of water. Generally, the mills draw this water from nearby lakes and rivers and, after employing it in the pulp and/or paper making process, return it to the source from which it was drawn. During the pulp and/or paper making process, however, deleterious solids, such as dirt, fibers, chemicals, bark, and the like, which are natural by-products of the process, contaminate the water. Conventionally, the mills have returned these deleterious solids with the water to the source from which the latter was drawn and have thereby contaminated the water source.

Recently, there has been an increasing demand that the mills remove these deleterious solids from the water prior to returning the latter to its source. This demand, in some instances, has been accompanied by the undertaking of legal steps to force the pulp and paper mills to clean the water before returning it to its source.

Currently, however, no satisfactory machinery, except expensive sewage treatment plants, has been provided for removing deleterious solids from the mill effluent fluid. For instance, lagoons (i.e., sedimentation holes in the ground) which have been utilized for this purpose have been found to be undesirable in that they are usually odorous and expensive in maintenance and land area. Linear screens on inclined troughs, inclined screens, and inclined screen drums which have also been tried for this purpose have been unsatisfactory as they do not achieve a sufficient degree of dewatering of the mill effluent fluid and are prone to blinding by pitch and resin. Thus, the mills are caught in the dilemma of having to remove deleterious solids from their employed water without having satisfactory, economical machinery for effecting this removal.

An object of the present invention is to provide a new and improved centrifugal filtering apparatus which is particularly constructed and arranged for providing economical and efficient removal of the deleterious solids contained in the effluent fluid from the water or liquid component of the effluent fluid.

Another object of the invention is to provide a new and improved centrifugal filtering apparatus of the type set forth which is particularly constructed and arranged to remove the bulk of the deleterious solids from the liquid component of the effluent fluid and to concentrate the removed deleterious solids such that they may be suitably disposed of, such as by subsequent screening and then burning.

Another object is to provide a new and improved centrifugal filtering apparatus of the type set forth which is particularly constructed and arranged to prevent filter blinding during initial operation and to be self-cleaning during continued operation.

These objects, and the other objects and advantages of the invention which will be apparent from the following description taken in connection with the accompanying drawings, are obtained by the provision of a centrifugal filtering apparatus comprising a housing having a cavity, and a screen rotatably disposed within the cavity. The screen peripherally defines an accepts chamber within the cavity and is spaced from the walls of the housing to provide a filter chamber between the screen and the walls of the housing. The screen is disposed within the cavity such that, during the rotation of the screen, pulses are caused in the effluent fluid in the cavity which remove deleterious solids from the screen. The screen furthermore, carries paddle means within the filter chamber which is provided between the screen and the walls of the housing. An inlet means is operatively connected to the housing to direct effluent fluid tangentially into the cavity and on the paddle means. An accepts outlet means communicates with the accepts chamber defined by the screen for discharging from the housing fluid accepted by the screen. A reject outlet means communicates with the filter chamber provided between the screen and the walls of the housing for discharging from the housing deleterious solids rejected, in concentrated form, by the screen.

In order to prevent the screen from blinding during its initial rotation, a third outlet means is connected to the housing adjacent the paddle means for receiving effluent fluid directed on the paddle means by the inlet means and discharging such effluent fluid from the housing. The inlet means and the third outlet means are relatively arranged such that, with the third outlet means open to fluid flow, effluent fluid passing on the paddle means from the inlet means cooperates with the paddle means to rotate the screen and then passes from the housing through the third outlet means. A valve means is provided for closing the third outlet means during the continued operation of the screen to prevent the effluent fluid from passing through the third outlet means during such continued operation.

Referring to the drawings:

FIG. 2 is a sectional view, with parts broken away for the purposes of illustration, taken on line 2—2 of FIG. 1, looking in the direction of the arrows;

FIG. 3 is a sectional view taken on line 3—3 of FIG. 1, looking in the direction of the arrows;

FIG. 4 is a sectional view taken on line 4—4 of FIG. 1, looking in the direction of the arrows;

Figure 1:
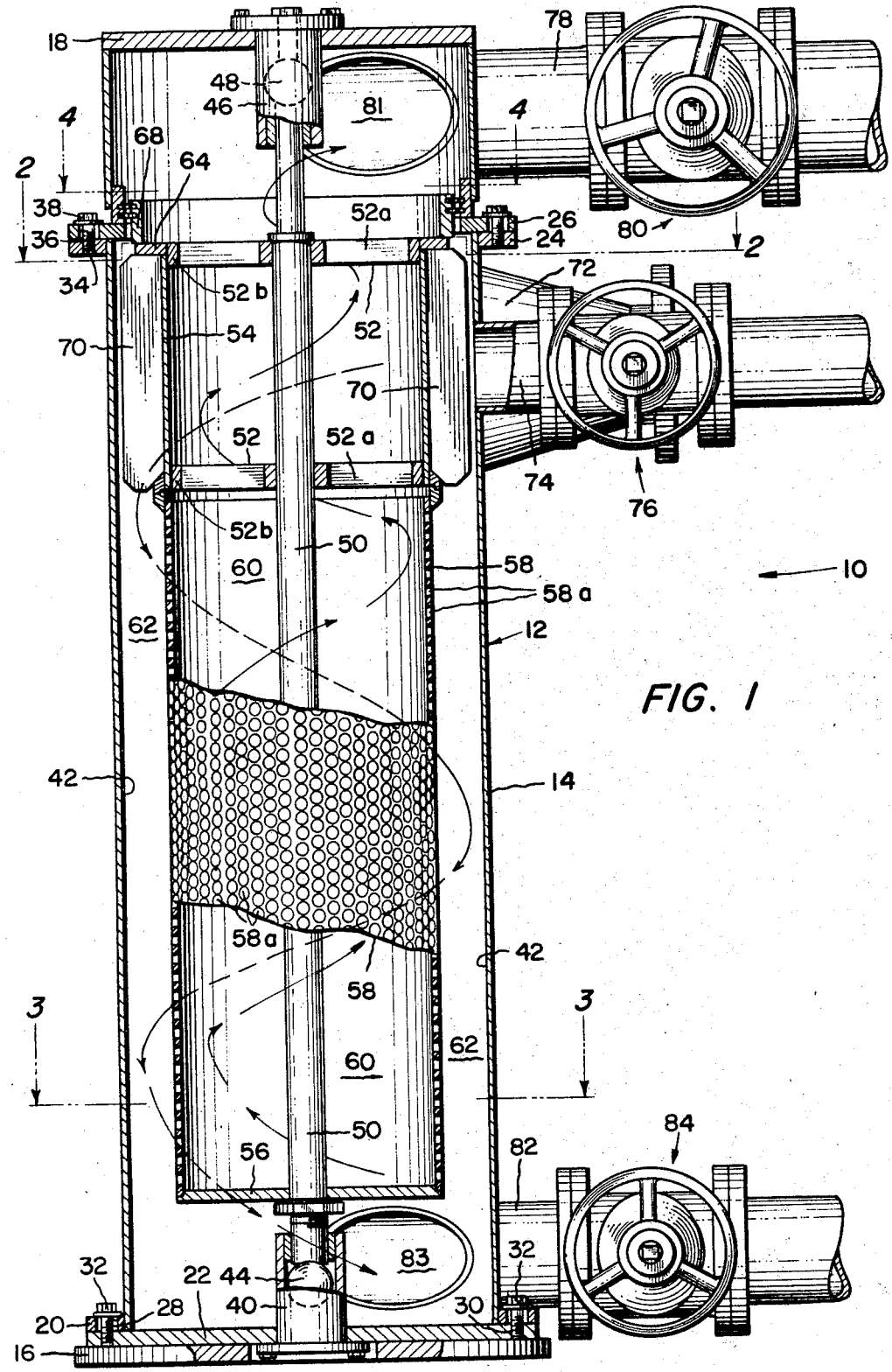
FIG. 1 is an elevational view, partially broken away and in section, of a centrifugal filtering apparatus constructed in accordance with the present invention, with the filter screen concentric with the housing of the apparatus.

Referring more particularly to the drawings wherein similar reference characters designate corresponding parts throughout the several views, FIG. 1 illustrates a centrifugal filtering apparatus designated generally as 10 which is constructed in accordance with the present invention. The centrifugal filtering apparatus 10 comprises a housing 12 including a vertically extending, cylindrical body 14 which is closed at its lower end by a ground supported, base 16 and at its upper end by a cylindrical cap 18.

The cylindrical body 14 fixedly carries an annular flange 20 in abutment with a flange portion 22 of the base 16, and an annular flange 24 in abutment with a flange portion 26 of the cylindrical cap 18. The annular flange 20 and the abutting flange portion 22 of the base 16 include a plurality of aligned openings 28 and 30, respectively, receiving threaded, mounting bolts 32 which secure the cylindrical body 14 to the base 16. The openings 28 in the annular flange 20 are formed sufficiently larger than the cross section of the mounting bolts 32 to allow the cylindrical body 14 to be secured by the mounting bolts 32 to the base 16 in a plurality of laterally displaced positions. The annular flange 24 and the abutting flange portion 26 of the cylindrical cap 18 include a plurality of aligned openings 34 and 36, respectively, receiving threaded, mounting bolts 38 which secure the cylindrical body 14 to the cylindrical cap 18. The openings 36 in the flange portion 26 of the cylindrical cap 18 are formed sufficiently larger than the cross section of the mounting bolts 38 to permit the cylindrical body 14 to be secured by the mounting bolts 38 to the cylindrical cap 18 in a plurality of laterally displaced positions.

The base 16 carries a vertically extending, bearing hub 40 which projects into the lower end of the cavity 42 circumferentially enclosed by the cylindrical body 14 and contains a ball bearing 44. The cylindrical cap 18 carries an aligned, depending, bearing hub 46 which contains a ball bearing 48. A supporting post 50 is vertically disposed within the cavity 42 with its opposing ends rotatably received by the bearing hubs 40, 46 and in engagement with the ball bearings 44, 48, respectively, therein. The supporting post 50 fixedly carries a plurality of vertically spaced, spiders 52 adjacent its upper end. The spiders 52 each include a plurality of spider arms 52a extending radially from the supporting post 50 and carrying a supporting ring 52b at their radially outward ends. The spider arms 52a are each of equal length such that the supporting rings 52b are located in alignment with one another and are concentric with the supporting post 50. An imperforate, cylindrical shell 54 is secured adjacent its opposing longitudinal ends to the supporting rings 52b for rotation with the supporting post 50.

The lower end of the supporting post 50 fixedly carries a radially extending, imperforate, circular plate 56 which is constructed of a radius substantially that of the supporting rings 52b. A cylindriccal screen 58, having a plurality of screening openings 58a, is secured at its upper end to the lower one of the supporting rings 52b and at its lower end to the circular plate 56. The cylindrical shell 54 and the cylindrical screen 58, thus, cooperate to divide the cavity 42 into a cylindrical, accepts chamber 60 which is circumferentially enclosed by such cylindrical members, and an annular, filter chamber 62 which extends intermediate such cylindrical members and the cylindrical body 14. A sealing means, such as the annular seal 64, is disposed adjacent the upper end of the cylindrical shell 54 for ensuring that the screening openings 58a in the cylindrical screen 58 form the sole fluid communication between the filter chamber 62 and the accepts chamber 60. The cylindrical cap 18, furthermore, carries an annular baffle 68 which cooperates with the annular seal 64 to prevent fluid from passing from the filter chamber 62 directly into the cylindrical cap 18.

The cylindrical shell 54 fixedly carries a plurality of vertically extending, radial, paddles or blades 70 within the filter chamber 62. The blades 70 are contoured to allow a limited, relative lateral movement of the cylindrical shell 54 and the cylindrical body 14 without their engaging the cylindrical body 14.

The cylindrical body 14 carries an inlet conduit 72 which communicates with the filter chamber 62 through a tangential opening 73 formed in the cylindrical body 14 adjacent the blades 70. The inlet conduit 72, during the operation of the centrifugal filtering apparatus 10, is connected to a source (not shown) of effluent fluid and discharges such effluent fluid tangentially into the filter chamber 62 and on the blades 70. The cylindrical body 14, also, carries an outlet conduit 74 which communicates with the filter chamber 62 through a tangential opening 75 formed in the cylindrical body 14 adjacent the blades 70. The outlet conduit 74, as illustrated in the drawings, communicates with the filter chamber 62 at least 180 degrees of rotation of the cylindrical screen 58 after the communication of the inlet conduit 72 therewith. The outlet conduit 74, during the operation of the centrifugal filtering apparatus 10, is connected to the source (not shown) of effluent fluid discharging effluent fluid to the inlet conduit 72. The outlet conduit 74 contains a manually operable, flow control valve, designated generally as 76, which is operable to prevent fluid passage through the outlet conduit 74.

The cylindrical cap 18 carries an accepts outlet conduit 78 which communicates with the accepts chamber 60 through a tangential opening 81 formed in the cylindrical cap 18 and contains a manually operable, flow control valve 80. The accepts outlet conduit 78, during the operation of the centrifugal filtering apparatus 10, is connected to the source (not shown) from which the water in the effluent fluid was drawn or, alternatively, if the water is to be reused by the mill, to the mill. The lower end of the cylindrical body 14 carries a rejects outlet conduit 82 which communicates with the filter chamber 62 through a tangential opening 83 in the cylindrical body 14 and contains a manually operable, flow control valve 84. The rejects outlet conduit 83, during the operation of the cylindrical filtering apparatus 10, may be connected to a centrifugal thickener or drainer (not shown) of the type disclosed in United States Patent No. 3,114,309, issued Dec. 17, 1963, to Anton Haug. The centrifugal thickener, in turn, is preferably connected to a refuse burner (not shown) to discharge drained and thickened solids thereto.

In the operation of the beforedescribed centrifugal filtering apparatus 10, with the cylindrical screen 58 at rest and prior to the introduction of effluent fluid into the filter chamber 62 through the inlet conduit 72, the flow control valve 80 in the accepts outlet conduit 78 is manually adjusted to prevent fluid flow from the cavity 42 through the accepts outlet conduit 78. The flow control valve 76 in the outlet conduit 74 is, however, manually adjusted to permit full fluid flow from the cavity 42 through the outlet conduit 74. Thus, when effluent fluid is subsequently admitted into the cavity 42 through the inlet conduit 72, such effluent fluid acts on the blades 70 to rotate the cylindrical screen 58 and thence flows back into its source through the outlet conduit 74. This fluid flow prevents blinding of the screening openings 58a in the cylindrical screen 58 which might otherwise result if the entire fluid flow were directed towards the screening openings 58a before the cylindrical screen 58 had attained its operating rotational velocity. This fluid flow is continued until the cylindrical screen 58 attains its operating rotational velocity.

At such time, the flow control valve 80 in the accepts outlet conduit 78 is manually adjusted to permit fluid flow through the accepts outlet conduit 78. The flow control valve 76 in the outlet conduit 74 is manually adjusted to prevent further fluid flow through the outlet conduit 74. Thereafter, the effluent fluid entering the filter chamber 62 is filtered by the cylindrical screen 58 to separate the water component thereof from the deleterious solids therein.

More specifically, as the effluent fluid flows tangentially into the filter chamber 62 from the inlet conduit 72, it acts on the blades 70 to rotate the cylindrical screen 58, and subsequently flows, as shown by the arrows in FIG. 1, in a cyclonic flow towards the base 16. During this cyclonic flow of the effluent fluid, the twigs, bark, dirt, and other heavy, deleterious solids which are contained therein fall by a combination of gravity and centrifugal force towards the base 16. The rejects outlet conduit 82 conveys these heavy, deleterious solids from the filter chamber 62 and discharges them into a centrifugal thickener or drainer (not shown) where they are drained prior to being burned in a refuse burner or otherwise suitably destroyed. It will be seen that, as the rejects outlet conduit 82 communicates tangentially with the filter chamber 62, this discharge of the heavy, deleterious solids from the housing 12 does not interfere with the cyclonic flow of the effluent fluid.

Simultaneously with the beforedescribed centrifugal separation of the heavy, deleterious solids, the cylindrical screen 58 separates the lighter, deleterious solids contained in the effluent fluid from the water component thereof. The water component flows through the screening openings 58a into the accepts chamber 60 and, thence, flows cyclonically upwards, as shown by the arrows in FIG. 1, into the cylindrical cap 18. The accepts outlet conduit 78 discharges the water component from the cylindrical cap 18 and reconveys it to the source (not shown) from which it was drawn. The lighter deleterious solids separated from the water component by the cylindrical screen 58 may adhere to the outer circumference of the cylindrical screen 58.

To remove these lighter, deleterious solids from the outer circumference of the cylindrical screen 58, the cylindrical screen 58 and the cylindrical body 14 are relatively moved to position the cylindrical screen 58 eccentrically within the cavity 42 enclosed by the cylindrical body 14. More specifically, the mounting bolts 32, 38 which secure the opposing ends of the cylindrical body 14 to the base 16 and the cylindrical cap 18, respectively, are sufficiently loosened to permit lateral movement of the cylindrical body 14 relative to the base 16 and the cylindrical cap 18. Then, the cylindrical body 14 is manually, laterally moved relative to the base 16 and the cylindrical cap 18 to position the cylindrical screen 58 eccentrically within the cavity 42. This lateral movement of the cylindrical body 14 may be a relatively small distance, for example only one-quarter of an inch, so long as the cylindrical screen 58 is resultantly disposed eccentrically within the cavity 42. The mounting bolts 32, 38 are then retightened to secure the cylindrical body 14 to the base 16 and the cylindrical cap 18 with the cylindrical screen 58 in such eccentric position.

Figure 6:
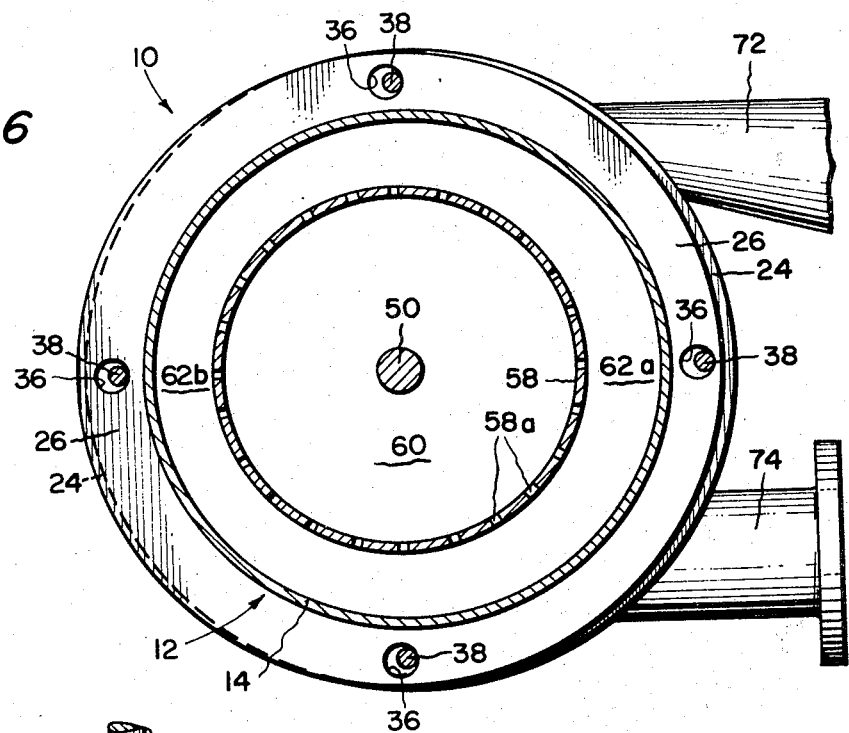
FIG. 6 is a sectional view taken on line 6—6 of FIG. 5, looking in the direction of the arrows.
Figure 5:
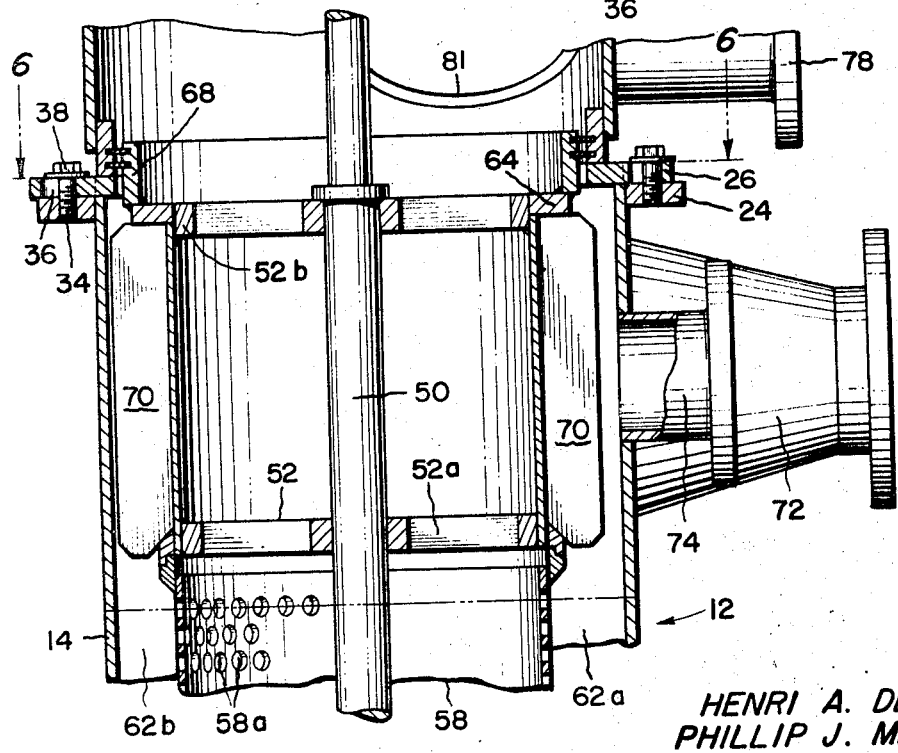
FIG. 5 is an enlarged, fragmentary, elevational view of the centrifugal filtering apparatus illustrated in FIG. 1, showing the screen eccentric with the housing of the apparatus.

The beforedescribed relative movement of the cylindrical body 14 and the cylindrical screen 58, as illustrated in FIG. 6, unbalances the volumes of the portions of the filter chamber 62 upon opposing sides of the cylindrical screen 58. That is, this relative movement of such members increases the flow volume of the portion 62a of the filter chamber 62 and correspondingly decreases the flow volume of the portion 62b of the filter chamber 62 on the opposing side of the cylindrical screen 58. Thus, continued rotation of the cylindrical screen 58 causes the cyclonically flowing, effluent fluid in the filter chamber 62 to successively flow through portions thereof of continuously varying flow volume. This flow of the effluent fluid causes pulsations of the fluid as it flows from the reduced volume portion 62b of the filter chamber 62 to the increased volume portion 62a thereof and, resultantly, removes lighter, deleterious solids from the outer circumference of the cylindrical screen 58. Thus, the cylindrical screen 58 may be automatically freed from adhering, lighter, deleterious solids during the operation of the centrifugal filtering apparatus 10.

From the foregoing, it will be seen that we have provided new and improved means for accomplishing all of the objects and advantages of our invention.

It will be understood, however, that the beforedescribed embodiment of our invention has been given by way of illustration only and that our invention is not limited to this described embodiment, but, rather, contemplates other embodiments and variations employing the concepts and teachings of this disclosed embodiment.

What is claimed is:

1. A filtering apparatus for separating deleterious solids contained in the effluent fluid discharged by pulp and paper making machinery from the liquid in the effluent fluid, comprising:
   a housing defining a cavity;
   a screen rotatably disposed in said cavity;
   said screen peripherally defining an accepts chamber and being spaced from the walls of said housing to provide a filter chamber between said screen and the walls of said housing;
   inlet means adapted for connection to a source of effluent fluid and communicating with said cavity to direct effluent fluid tangentially into said filter chamber;
   accepts outlet means communicating with said accepts chamber for discharging from said housing liquid accepted by said screen;
   rejects outlet means communicating with said filter chamber for discharging from said housing deleterious solids rejected by said screen;
   said screen and said housing being relatively movable between relative positions wherein said screen is concentric with said cavity and relative positions wherein said screen is eccentric with said cavity; and
   mounting means for retaining said screen and said housing in said alternative concentric and eccentric relative positions.

2. A filtering apparatus according to claim 1, wherein said rejects outlet means is arranged to receive deleterious solids tangentially from said cavity.

3. A filtering apparatus according to claim 1, further comprising paddle means carried by said screen in said filter chamber, and a third outlet means, said inlet means directing effluent fluid on said paddle means, and said inlet means and said third outlet means being connected to said filter chamber at the level of said paddle means and communicating through said filter chamber.

4. A filtering apparatus according to claim 3, wherein said third outlet means is connected to said housing to receive effluent fluid tangentially from said filter chamber and valve means are provided for controlling the flow of effluent fluid through said outlet means.

5. A filtering apparatus according to claim 4, wherein said inlet means and said third outlet means are relatively arranged such that effluent fluid entering said filter chamber from said inlet means cooperates with said paddle means to rotate said screen before being discharged from said filter chamber through said third outlet means.

6. A filtering apparatus according to claim 5, wherein said third outlet means communicates with said filter chamber at least 180 degrees of screen rotation after the communication of said inlet means with said filter chamber.

7. A filtering apparatus for separating deleterious solids contained in the effluent fluid discharged by pulp and paper making machinery from the liquid in the effluent fluid, comprising:
- a housing defining a cavity;
- a screen rotatably disposed within said cavity;
- said screen peripherally defining an accepts chamber and being spaced from the walls of said housing to provide a filter chamber between said screen and the walls of said housing;
- paddle means carried by said screen in said filter chamber;
- inlet means adapted to be connected to receive effluent fluid from a source thereof and connected to said filter chamber at the level of said paddle means for directing effluent fluid tangentially into said filter chamber and on said paddle means;
- accepts outlet means communicating with said accepts chamber for discharging from said housing liquid accepted by said screen;
- rejects outlet means communicating with said filter chamber for discharging from said housing deleterious solids rejected by said screen;
- third outlet means tangentially connected to said filter chamber at the level of said paddle means and communicating with said inlet means through said filter chamber; and
- valve means for controlling the flow of effluent fluid through said third outlet means.

8. A filtering apparatus according to claim 7, wherein said inlet means and said third outlet means are relatively arranged such that effluent fluid entering said filter chamber from said inlet means cooperates with said paddle means to rotate said screen before being discharged from said filter chamber through said third outlet means.

9. A centrifugal filtering apparatus according to claim 7, wherein said third outlet means communicates with said filter chamber at least 180 degrees of screen rotation after the communication of said inlet means with said filter chamber.

10. In a filtering apparatus, a housing containing a cavity, a rotatable screen in said cavity and peripherally enclosing an accepts chamber and spaced from the walls of said housing to provide a filter chamber between said screen and the walls of said housing, an inlet tangentially communicating with said filter chamber, an accepts outlet communicating with said accepts chamber, a rejects outlet communicating with said filter chamber, said screen and said housing being relatively movable between relative positions wherein said screen is concentric with said cavity and relative positions wherein said screen is eccentric with said cavity, and mounting means for retaining said screen and said housing in said alternative relative positions.

11. A filtering apparatus according to claim 10, wherein said screen and said housing are annular, said rejects outlet tangentially communicates with said cavity, and said accepts outlet communicates with said accepts chamber at one end thereof.

12. In a filtering apparatus, a housing containing a cavity, a rotatable screen in said cavity and peripherally enclosing an accepts chamber and spaced from the walls of said housing to provide a screening chamber between said screen and the walls of said housing, a plurality of paddles carried by said screen in said filter chamber, an inlet tangentially connected to said filter chamber at the level of said paddles, an accepts outlet communicating with said accepts chamber, a rejects outlet communicating with said filter chamber, a third outlet tangentially connected to said filter chamber at the level of said paddles and at least 180 degrees of screen rotation after the connection of said inlet to said filter chamber whereby said inlet and third outlet communicate through said filter chamber, and valve means for controlling fluid flow from said filter chamber through said third outlet.

13. A filtering apparatus according to claim 12, further comprising second valve means for controlling fluid flow through said accepts outlet, said valve means and second valve means being selectively operable to permit alternative fluid flow through said third outlet and said accepts outlet.

References Cited
UNITED STATES PATENTS

| | | | |
|---|---|---|---|
| 1,869,797 | 8/1932 | Cleaver | 210—512 X |
| 2,732,943 | 1/1956 | Hagberg | 210—354 X |
| 3,174,622 | 3/1965 | Lamort | 210—304 X |
| 3,241,676 | 3/1966 | Neuville et al. | 210—391 X |

REUBEN FRIEDMAN, *Primary Examiner.*

J. L. DE CESARE, *Assistant Examiner.*

U.S. Cl. X.R.

209—304, 380; 210—354, 360